Jan. 30, 1951     D. B. CLARK     2,539,569
ACYCLIC GENERATOR
Filed Sept. 2, 1948

INVENTOR.
DUDLEY B. CLARK
BY Fay, Golrick & Fay
ATTORNEYS

Patented Jan. 30, 1951

2,539,569

UNITED STATES PATENT OFFICE 2,539,569

ACYCLIC GENERATOR

Dudley B. Clark, Palm Springs, Calif.

Application September 2, 1948, Serial No. 47,427

8 Claims. (Cl. 171—212)

The present invention relates to an acyclic generator and a method of fabricating the armature thereof.

An object of the present invention is to provide an acyclic generator having a structural arrangement which lends itself to economical mass production.

Another object of the invention is to provide a generator having no field winding or commutator.

A further object of the invention is to provide an acyclic generator having a permanent magnet exciter and which magnet may be adjusted for varying the voltage produced by the generator.

A still further object of the invention is to provide an armature and a method of forming an armature for an acyclic generator, which armature may be manufactured with a minimum of material and which is easily balanced for high speed rotation.

Other objects and advantages of the invention will be apparent from the following description of preferred forms of embodiment of the invention, reference being made to the accompanying drawings wherein.

Acyclic generators have not been widely used because the known structures have been difficult to construct and they could not be produced economically. My invention provides a generator particularly suitable for relatively low voltage generation, 7 to 32 volts for example, and which can be manufactured more economically than other types of generators.

Figure 1:
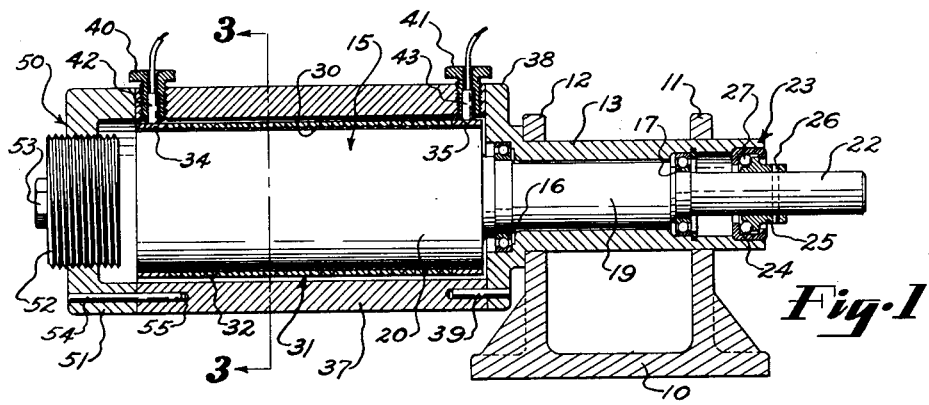
Fig. 1 is a longitudinal sectional view of a generator embodying one form of my invention.
Figure 2:
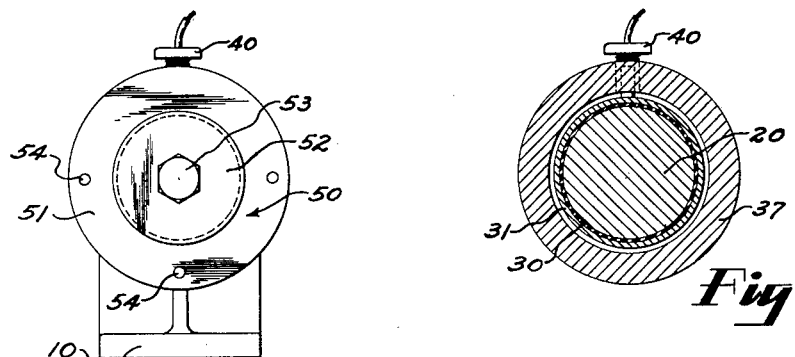
Fig. 2 is an end view of the generator shown in Fig. 1.
Figure 3:
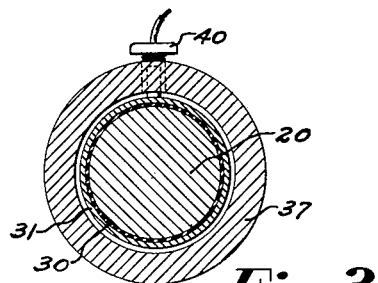
Fig. 3 is a view taken on line 3—3 of Fig. 1.

Referring now to Figs. 1, 2 and 3, the generator shown is mounted on a non-magnetic stand 10 having uprights 11 and 12 which support a tubular non-magnetic housing 13. A rotor 15 is mounted in the housing 13 by ball bearings 16 and 17, the rotor having a drive shaft 19 which is journalled in the ball bearings.

The rotor 15 comprises a cylindrical portion 20 which is formed of iron of high magnetic permeability and the drive shaft 19 is formed integral therewith and includes a hardened portion 22 for receiving a suitable drive pulley, not shown, by which the rotor may be rotated.

Preferably, a thrust bearing 23 is provided in housing 13 for preventing movement of the rotor 15 to the left as viewed in Fig. 1. The thrust bearing may be of any suitable type and in the present instance it is shown as a roller bearing comprising an outer race 24 press fitted in the end of housing 13 and having an inner race 25 secured to the shaft 19 by a pin 26, which extends through the hub of the race 25 and through the shaft 19. A series of balls 27 are mounted between the two races.

The portion 20 of the rotor is covered by a layer of insulating material 30, and preferably this material consists of glass cloth impregnated with a dielectric material such as silicon, although any other suitable material could be used. Surrounding the portion 20 of the rotor and overlying the insulation 30 is a cylindrical armature 31, which consists of a flat copper wire 32 which is wound in the form of a helix about the portion 20, with the convolutions of the helix being in electrical contact throughout, either by direct contact or connected by suitable brazing material, so that in effect the finished armature is a continuous cylinder of electrical conducting material. The ends of the armature 31 are attached to silver rings 34 and 35, preferably by brazing the rings to the end convolutions of the coil, the latter convolutions being tapered so that they engage the edges of the rings throughout the circumference thereof. The convolutions may be compressed laterally to form good electrical contact therebetween or it may be desirable to braze the convolutions together to form good electrical contact therebetween. After the armature 31 is thus formed it may be machined to the proper outside diameter after which a suitable enamel is applied thereto as is usual in the formation of armatures. The rings 34 and 35, however, are uncoated and they serve as pick-up rings. This method of constructing the armature is economical and provides an integral, well balanced armature structure having an outer sleeve of conducting material carried on a rotor of magnetic material with the sleeve insulated from the rotor.

A cylindrical field piece 37 is mounted at one end to a flange 38 formed on the housing 13, by suitable bolts, one of which is shown at 39. The field piece is formed of material similar to the rotor portion 20 and it constitutes a pole of a magnetic structure described more fully hereinafter.

The field piece includes brush holders 40 and 41 which are threaded into openings therethrough, the latter openings being in alignment with the collector rings 34 and 35 of the armature. Suitable brushes 42 and 43 are held in the members 40 and 41 and are adapted to ride on the rings 34 and 35, respectively. The brushes are connected with wires for carrying away the current generated.

A magnet 50 is mounted over the open end of the field piece 37 and this magnet consists of a cup shaped element 51 having a circular wall which coincides with the end edge of the field piece 37 and the central portion of the cup piece has an opening into which a plug member 52 is threaded. Both the element 51 and member 52 are formed of highly magnetic material and these parts comprise a permanent magnet, one pole of which consists of the member 52, and the periphery of the element 51 constituting the other pole. The position of the right-hand end of the pole member 52 relative to the rotor 15 may be adjusted by rotation thereof in the threaded opening and this rotation is facilitated by a hex formation 53 formed on the outer end of member 52.

The magnet 50 will be tightly held to field piece 37 by magnetic action and three guide pins 54 may be provided in the element 51, which pins extend into corresponding openings 55 formed in the end of the field piece 37 to maintain the magnet centered on field piece 37. It will be noted that an axial stress will be placed on rotor 15 tending to draw the latter to the magnet 50 but this force is resisted by thrust bearing 23.

It will be seen that a magnetic field is established between the field piece 37 and the pole member 52, which field traverses portion 20 of the rotor and cuts the armature sleeve 31. Thus, when the rotor 15 is rotated current will be generated in the armature 31 and collected at rings 34 and 35 by the brushes. The voltage will depend upon the spacing between the outer end of the portion 20 of the rotor and the adjacent end of pole piece 52, the voltage output being increased as the space between the pole piece and rotor is decreased.

Figure 4:
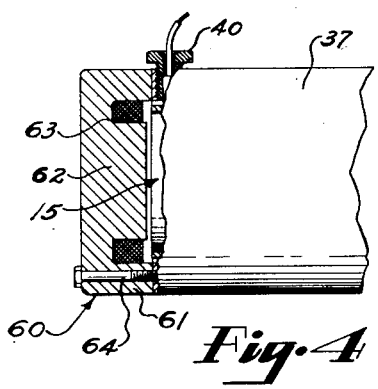
Fig. 4 is a fragmentary view, part in section, showing another form of exciter magnet for the generator.

Another type of magnet may be substituted for the magnet 50, and in Fig. 4, I have shown an electromagnet 60 which comprises a cup shaped member 61 having a central pole piece 62 about which is a suitable coil of wire 63. The coil 63 is connected to a suitable source of current, not shown, for establishing a magnetic field. The magnet 60 is mounted to the end of field piece 37 by suitable attaching devices such as bolts, one of which is shown at 64. Preferably, control means would be provided for adjusting the voltage supplied to the magnetic coil 63 to vary the voltage output of the generator as desired.

In some instances it may be desirable to provide cooling means for the generator, but no such means is shown here for the sake of clarity.

It will be apparent that the elements comprising my generator are of such nature that they may be easily formed and the assembly of the generator can be effected with great facility. The magnet exciter is accessible for adjustment of the voltage.

The generator has no parts which are affected by temperatures which might damage conventional generators and its safe operating temperature is well above those of the usual type employing windings.

Although I have described but two forms of the invention, other forms might be adopted, all falling within the scope of the claims which follow.

I claim:

1. An acyclic generator comprising, a cylindrical rotor of magnetic permeable material; an electrical conducting sleeve mounted over said rotor and insulated therefrom; a magnet having one pole piece adjacent to a surface of said sleeve and the other pole adjacent one end of said rotor; and means for selectively adjusting the relative positions of said other pole and rotor.

2. An acyclic generator comprising, a cylindrical rotor of magnetic permeable material; an electrical conducting sleeve mounted on said rotor and insulated therefrom; a magnet having one pole piece adjacent to and coextensive with the outer surface of said drum and the other pole adjacent one end of said rotor; and means for selectively adjusting the position of the last mentioned pole relative to the rotor.

3. An armature for an acylic generator comprising, a cylindrical rotor of magnetic permeable material; a layer of insulating material surrounding the rotor; a strip of wire closely wound over said insulation in the form of a helix with the convolutions in electrical contract throughout the extent thereof.

4. An armature for an acyclic generator comprising, a cylindrical rotor of magnetic permeable material; a layer of sheet like insulating material surrounding the rotor; a strip of wire closely wound over said insulation in the form of a helix with the convolutions in electrical contact throughout the length thereof.

5. The method of fabricating an armature comprising, forming a cylindrical rotor of magnetic permeable material; covering the cylindrical surface of the rotor with a layer of insulating material surrounding the rotor; wrapping a strip of wire on the rotor over the insulation in the form of a helix with the convolutions engaging one another; brazing said convolutions together; and machining said wire helix to size.

6. An acyclic generator comprising, a cylindrical rotor of magnetic permeable material; an electrical conducting sleeve mounted on said rotor and insulated therefrom, said rotor having a shaft extending from one end thereof; bearing means for rotatively supporting the shaft; a cylindrical magnetic permeable member surrounding said sleeve and being spaced therefrom; a magnetic pole piece disposed adjacent to the other end of said rotor and forming a magnet with said cylindrical member; and adjustable means for positioning said pole piece relative to said other end of the rotor.

7. An acyclic generator comprising a cylindrical rotor of magnetic permeable material, an electrical conducting sleeve mounted over said rotor and insulated therefrom, a magnet having one pole piece surrounding the sleeve and spaced therefrom and the other pole adjacent one end of said rotor, and means for selectively adjusting the relative positions of said other pole and rotor to vary the voltage of the generator.

8. An acyclic generator comprising a cylindrical rotor of magnetic permeable material supported from one end, an electrical conducting sleeve mounted on said rotor and insulated therefrom, a magnet having one pole piece adjacent to and coextensive with the outer surface of said rotor and the other pole piece adjacent to the opposite end of said rotor and means for selectively adjusting the position of the end pole piece relative to the rotor.

DUDLEY B. CLARK.

(References on following page)

REFERENCES CITED

The following references are of record in the file of this patent:

UNITED STATES PATENTS

| Number | Name | Date |
|---|---|---|
| 342,504 | Eickemeyer | May 5, 1886 |
| 561,803 | Mayer | June 9, 1896 |
| 1,110,029 | Alexanderson | Sept. 8, 1914 |
| 1,362,008 | Kane | Dec. 14, 1920 |
| 1,791,978 | Sessions | Feb. 10, 1931 |
| 1,813,496 | Kennedy | July 7, 1931 |
| 2,200,039 | Nicoll | May 7, 1940 |

FOREIGN PATENTS

| Number | Country | Date |
|---|---|---|
| 110,700 | Germany | May 21, 1900 |